(12) United States Patent
Min et al.

(10) Patent No.: US 7,223,010 B2
(45) Date of Patent: May 29, 2007

(54) LIGHT GUIDE PANEL OF EDGE-LIGHT TYPE BACKLIGHT SYSTEM AND EDGE-LIGHT TYPE BACKLIGHT SYSTEM EMPLOYING THE SAME

(75) Inventors: Jee-hong Min, Yongin-si (KR);
Hwan-young Choi, Yongin-si (KR);
Moon-gyu Lee, Suwon-si (KR);
Jin-hwan Kim, Suwon-si (KR);
Jin-seung Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 210 days.

(21) Appl. No.: 10/824,477

(22) Filed: Apr. 15, 2004

(65) Prior Publication Data

US 2004/0207775 A1 Oct. 21, 2004

(30) Foreign Application Priority Data

Apr. 16, 2003 (KR) ...................... 10-2003-0023978

(51) Int. Cl.
*F21V 7/04* (2006.01)
(52) U.S. Cl. ...................... 362/628; 362/626
(58) Field of Classification Search ................ 362/628, 362/611, 612, 626
See application file for complete search history.

(56) References Cited

U.S. PATENT DOCUMENTS 6,371,623 B1 4/2002 Toyoda
6,480,307 B1 * 11/2002 Yang .......................... 359/15
7,128,459 B2 * 10/2006 Igarashi et al. ............. 362/621

FOREIGN PATENT DOCUMENTS

| JP | 2001-43717 A | 2/2001 |
|---|---|---|
| JP | 2001-43718 A | 2/2001 |
| JP | 2001-43720 A | 2/2001 |
| JP | 2001-228474 A | 8/2001 |
| JP | 2002-169034 A | 6/2002 |
| JP | 2002169034 | * 6/2002 |
| JP | 2002-277873 A | 9/2002 |
| KR | 10-2001-0039013 | * 10/1999 |
| KR | 10-2001-0039013 | 5/2001 |
| KR | 2001-0057327 A | 7/2001 |
| KR | 2001-0103552 A | 11/2001 |
| KR | 2002-0041480 A | 6/2002 |
| KR | 2002-0076687 A | 10/2002 |

* cited by examiner

*Primary Examiner*—Renee Luebke
*Assistant Examiner*—Julie A. Shallenberger
(74) *Attorney, Agent, or Firm*—Sughrue Mion, PLLC (57) ABSTRACT

An edge-light type backlight system including a point light source, a light guide panel including a light incident part into which light enters from the point light source and a light emitting surface from which light is emitted, and an optical path-changing unit which changes a propagation path of light traveling inside the light guide panel. The light incident part includes a light incident surface on which a prism pattern is formed, the light incident surface facing the point light source, and first and second surfaces extending from the light incident surface in a direction in which light travels inside the light guide panel and adapted to reflect light passing through the light incident surface to reduce a direction angle, the first and second surfaces being opposite to each other with respect to an optical axis.

14 Claims, 7 Drawing Sheets

53.6 FLUX / STERADIAN

—— VERTICAL ANGLE
—— HORIZONTAL ANGLE

FIG. 11

51 FLUX / STERADIAN

—— VERTICAL ANGLE
—— HORIZONTAL ANGLE

LIGHT GUIDE PANEL OF EDGE-LIGHT TYPE BACKLIGHT SYSTEM AND EDGE-LIGHT TYPE BACKLIGHT SYSTEM EMPLOYING THE SAME

BACKGROUND OF THE INVENTION

This application claims priority from Korean Patent Application No. 2003-23978, filed on Apr. 16, 2003, with the Korean Intellectual Property Office, the disclosure of which is incorporated herein in its entirety by reference.

1. Field of the Invention

The present invention relates to a backlight system, and more particularly to an edge-light type backlight system using a light guide panel and a point light source.

2. Description of the Related Art

Backlight systems are used in flat panel displays (FPDs), such as liquid crystal displays (LCDs) to ensure proper luminance or brightness. Backlight systems are classified according to arrangement of light sources as direct-light type backlight units in which a plurality of lamps installed under FPD directly emit light to a liquid crystal panel, and edge-light type backlight units in which a lamp installed along one edge side of a light guide panel emits light to a liquid crystal panel.

Edge-light type backlight systems can use both a rod-shaped light source and a point light source. As a representative rod-shaped light source, there is a cold cathode fluorescent lamp (CCFL) which consists of a tube with electrodes at both ends thereof. As a representative point light source, there is a light emitting diode (LED). CCFLs have many advantages, such as being able to emit strong white light, obtain high luminance and uniformity and being applied to large FPDs. However, CCFLs have disadvantages as well, such as being operated by a high-frequency AC signal and has a narrow operating temperature range. LEDs are inferior to CCFLs when it comes to luminance and uniformity, but have advantages in that they are operated by a DC signal, have a longer life span and a wider operating temperature range, and can be made thin.

Figure 1:
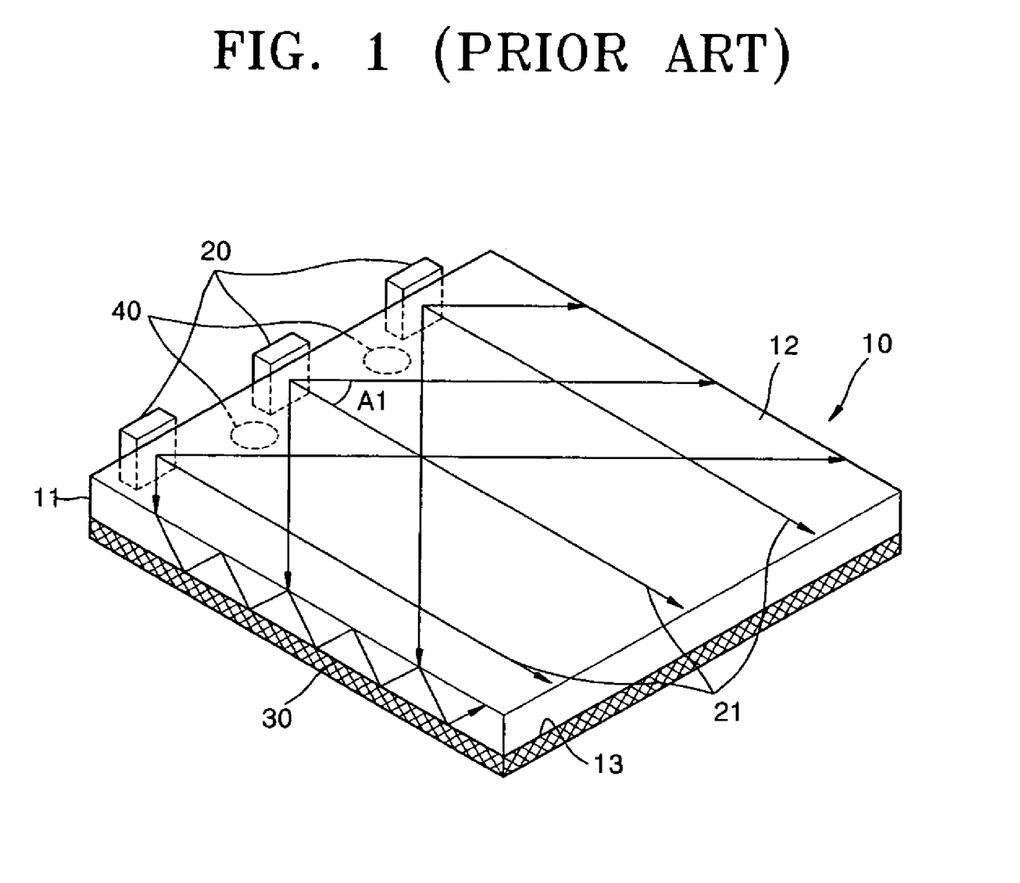
FIG. 1 is a schematic perspective view of a related art edge-light type backlight system using a point light source.
Figure 2:
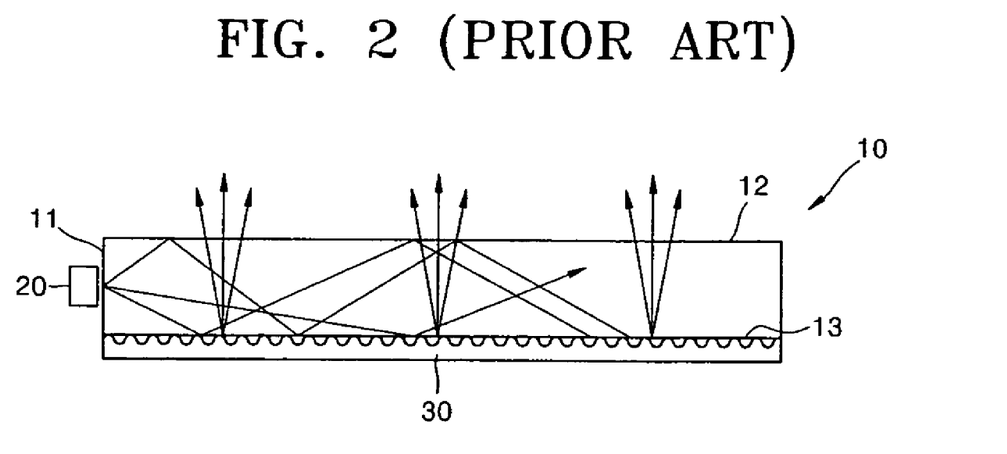
FIG. 2 is a side view of the related art edge-light type backlight system of FIG. 1.

FIG. 1 is a schematic perspective view of a related art edge-light type backlight system using a point light source, and FIG. 2 is a side view of the related art edge-light type backlight system of FIG. 1.

Referring to FIG. 1, three LEDs 20 acting as point light sources are installed along one edge surface 11 of a light guide panel 10. A holographic pattern 30 is formed at a bottom surface 13 of the light guide panel 10 to function as an optical path-changing unit which emits light introduced from the LEDs 20 to a light emitting surface 12.

Figure 3:
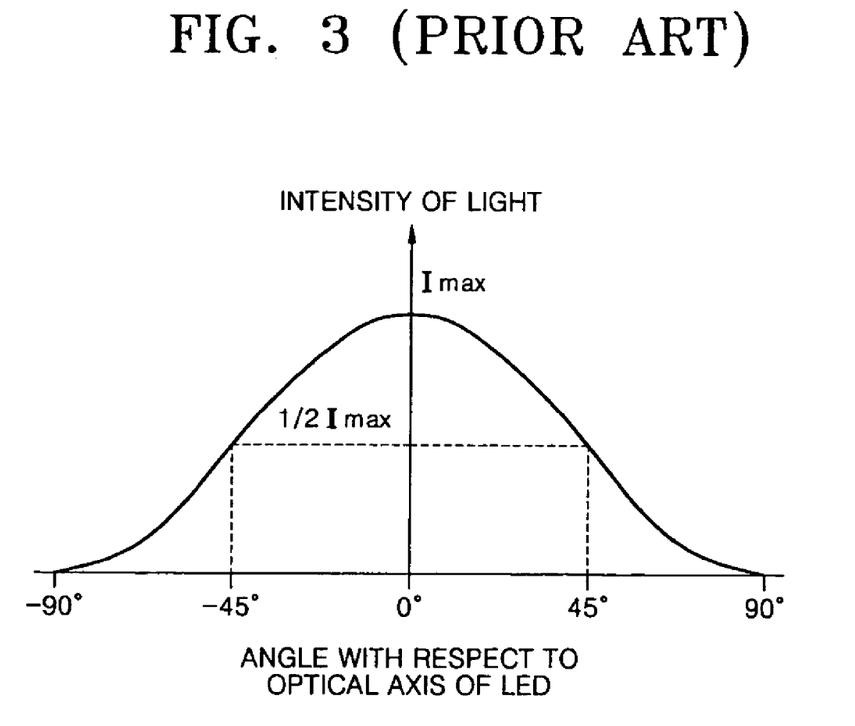
FIG. 3 is a graph of intensity of light emitted from a light emitting diode (LED) versus angle with respect to an optical axis of the LED.

The LEDs 20 emit light toward the edge surface 11 of the light guide panel 10. Since the LEDs 20 are point light sources, they emit light at all angles within ±90 degrees of an optical axis 21. FIG. 3 is a graph of the intensity of light emitted by an LED versus angle with respect to the LED's optical axis. As shown in FIG. 3, the angles at which the intensity is half maximum are about 45 degrees.

Light emitted from the LEDs 20 enters the light guide panel 10 through the edge surface 11. The light is refracted while passing through the edge surface 11, narrowing its spread. When the light guide panel 10 is made of polymethyl-methacrylate (PMMA) and has a refractive index of about 1.49, light propagating through the light guide panel 10 has a spread of ±42 degrees or less. In this case, no light reaches regions indicated by reference numeral 40 between the LEDs 20 directly; light can only reach the regions 40 after several reflections inside the light guide panel 10. Since the amount of reflected light reaching the regions 40 is smaller than the amount of light directly reaching other regions, the regions 40 include dark areas.

When there are dark areas, a screen of an FPD illuminated by the backlight system suffers unevenness in brightness across the areas.

Japanese Patent Publication No. 2001-043717 discloses another edge-light type backlight system using a point light source.

SUMMARY OF THE INVENTION

The present invention provides a light guide panel and an edge-light type backlight system employing the same, in which an angle of light introduced into the light guide panel is widened to remove dark areas between point light sources, and then reduced again to improve luminance of the light guide panel.

According to an aspect of the present invention, there is provided a light guide panel of an edge-light type backlight system comprising: a light incident part into which light enters from a point light source; and a light emitting surface from which light is emitted, wherein the light incident part comprises: a light incident surface on which a prism pattern is formed, the light incident surface facing the point light source; and first and second surfaces extending from the light incident surface in a direction in which light travels and adapted to reflect light passing through the light incident surface to reduce a direction angle, the first and second surfaces being opposite to each other with respect to an optical axis.

According to another aspect of the present invention, there is provided an edge-light type backlight system comprising: a point light source; a light guide panel including a light incident part into which light enters from the point light source and a light emitting surface from which light is emitted; and an optical path-changing unit which changes a propagation path of light that travels inside the light guide panel, wherein the light incident part comprises: a light incident surface on which a prism pattern is formed, the light incident surface facing the point light source; and first and second surfaces extending from the light incident surface in a direction in which light travels inside the light guide panel and adapted to reflect light passing through the light incident surface to reduce a direction angle, the first and second surfaces being opposite to each other with respect to an optical axis.

According to specific embodiments, the first and second surfaces may be symmetrical about the optical axis.

The prism pattern may have a horizontal section in the shape of triangles, and preferably, isosceles triangles. A pitch of the prism pattern may range from 10 to 100 μm.

A relationship between an apex angle of the prism pattern and an angle may satisfy the following formula: $C_3 \geq (90-\alpha) \times 2$, where $C_3$ denotes the apex angle of the prism pattern, and α denotes the angle at which intensity of light emitted by the point light source is half maximum. When a light emitting diode is used as a point light source, an apex angle of the prism pattern may be greater than 90 degrees.

The optical path-changing unit may include a holographic pattern or a scattering pattern formed on at least one of the light emitting surface of the light guide panel and a surface opposite to the light emitting surface.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 4:
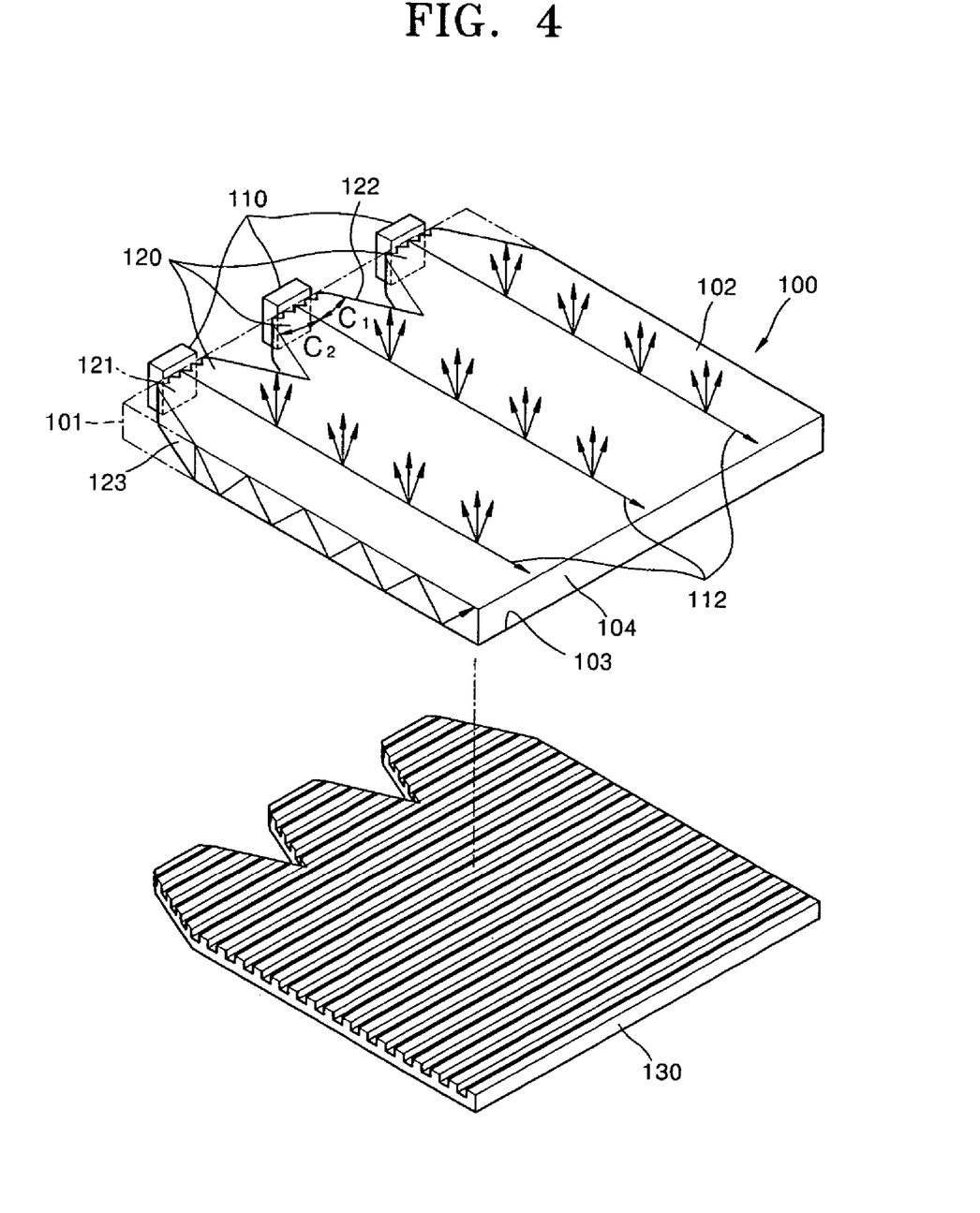
FIG. 4 is a perspective view of an edge-light type backlight system according to a preferred embodiment of the present invention.
Figure 5:
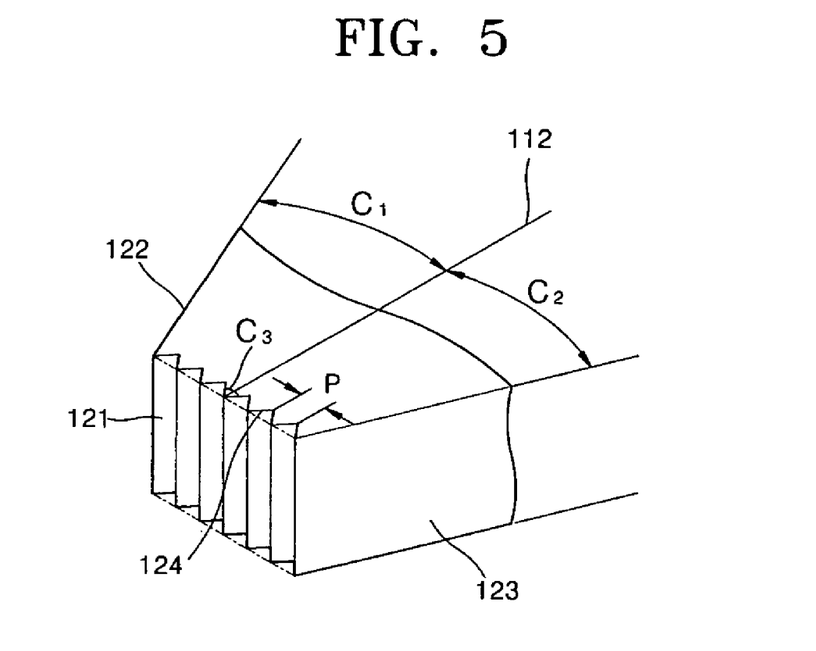
FIG. 5 is an enlarged perspective view of a light incident part of the edge-light type backlight system of FIG. 4.

FIG. 4 is a perspective view of an edge-light type backlight system according to an exemplary embodiment of the present invention, and FIG. 5 is an enlarged perspective view of a light incident part 120 of the edge-light type backlight system of FIG. 4.

Referring to FIGS. 4 and 5, a light guide panel 100 has a flat panel shape. Three light emitting diodes (LED) 110 are arranged along a virtual edge surface 101 of the light guide panel 100. An optical path-changing unit 130 is disposed under the light guide panel 100.

Each of the LEDs 110 acting as a point light source emits light within a spread of ±90 degrees about an optical axis 112. Here, as shown in FIG. 3, an angle at which light emitted from an LED has a half-maximum intensity is about 45 degrees.

The light guide panel 100 is made of a transparent material. In general, the light guide panel 100 is made of a transparent acrylic resin having a refractive index of 1.49 and a specific gravity of 1.19. To reduce weight, a transparent olefinic resin having a specific gravity of 1.0 can be used for the light guide panel as well. The light guide panel 100 according to one embodiment of the present invention is made of polymethyl-methacrylate (PMMA). The light guide panel 100 has a thickness ranging from 1 to 3 mm. To reduce weight, the light guide panel may have a wedge shape which becomes thinner with distance from the virtual edge surface 101 to which light is introduced. The size of the light guide panel 100 is dependent on the size of a flat panel display (not shown), for example, a liquid crystal display (LCD).

Three light incident parts 120 are arranged at the edge surface 101 of the light guide panel 100 to correspond to the respective LEDs 110. Each of the light incident parts 120 includes a light incident surface 121 through which light emitted from the LED 110 enters, the light incident surface 121 facing the LED 110, and first and second surfaces 122 and 123 extending from the light incident surface 121 in a direction in which light travels. The first and second surfaces 122 and 123 are positioned opposite to each other about the optical axis 112. As shown in FIG. 3, since the intensity of light emitted from the LED 110 is symmetrical about the optical axis 112, it is preferable that the first surface 122 and the second surface 123 are symmetrical about the optical axis 112. In other words, it is preferable that an angle $C_1$ between the first surface 122 and the optical axis 112 is the same as an angle $C_2$ between the second surface 123 and the optical axis 112. However, the present invention is not restricted to such a configuration. The angle $C_1$ between the first surface 122 and the optical axis 112 and the angle $C_2$ between the second surface 123 and the optical axis 112 may be properly determined to obtain a desired distribution of light emitted at a light emitting surface.

A prism pattern 124 is formed on the light incident surface 121. Referring to FIG. 5, in a cross-section of the prism pattern 124 in parallel to a top surface 102 of the light guide panel 100, the prism pattern 124 along the light incident surface 121 has a series of triangular teeth. An apex angle $C_3$ of the prism pattern 124 is preferably greater than 90 degrees, and the triangular teeth are preferably in the shape of isosceles triangles, when viewing the cross-section of the prism pattern 124 in parallel to the top surface 102. A pitch P of the prism pattern 124 is in the range of 10 to 100 μm, and preferably 50 μm.

A light emitting surface from which light is emitted is at least one of the top surface 102 and a bottom surface 103 of the light guide panel 100. In the present embodiment, the top surface 102 will be taken as the light emitting surface and referred to as the light emitting surface 102 hereinafter.

In order to emit light through the light emitting surface 102, an angle between light incident on the light emitting surface 102 and the normal line orthogonal to the light emitting surface 102, which is referred to as the "incident angle", should be smaller than a critical angle. Thus, among light propagating through the light guide panel 100, light having an incident angle smaller than the critical angle is transmitted through the light emitting surface 102 to be discharged, and remaining light is totally reflected back into the light guide panel 100. Light which has been totally reflected once cannot be emitted from the light guide panel 100 unless the incident angle thereof is changed.

The optical path-changing unit 130 changes the direction of propagation of light through scattering, diffraction, etc., to change the incident angle. Then, among light whose paths are changed, light having an incident angle with respect to the light emitting surface 102 that is smaller than the critical angle is transmitted through the light emitting surface 102 to be discharged and remaining light is again reflected.

Paths along which the reflected light travels are again changed by the optical path-changing unit 130, such that the reflected light is again incident on the light emitting surface 102.

As the optical path-changing unit 130, for example, a scattering pattern which scatters light or a holographic pattern which diffracts light can be used. The optical path-changing unit 130 can be disposed on either or both of the light emitting surface 102 and the bottom surface 103 opposite to the light emitting surface 102. In an exemplary embodiment, as shown in FIG. 4, a holographic pattern on which a diffraction grating is formed in parallel to the light incident surface 121 is used as the optical path-changing unit 130. It is preferable that the diffraction grating holographic pattern has a period of less than 2 μm. For example, the diffraction grating holographic pattern may have a period of 0.4 μm and a depth of 0.2 μm.

Now, the operation of the edge-light type backlight system according to the exemplary embodiment shown in FIGS. 4 and 5 will be explained.

Light emitted from the LED 110 is introduced to the prism pattern 124 disposed at the light incident surface 121.

Figure 6:
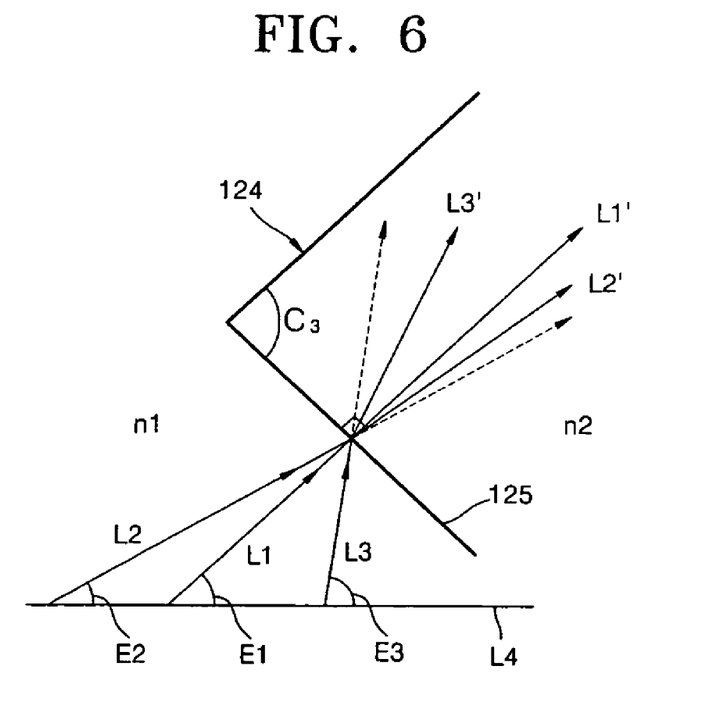
FIG. 6 is a diagram illustrating the operation of a prism pattern.

FIG. 6 is a diagram illustrating operation of the prism pattern 124. Referring to FIG. 6, three light rays L1, L2 and L3 forming angles E1, E2 and E3 with respect to a line L4 parallel to the optical axis 112 are incident on an inclined plane 125 of the prism pattern 124.

The light ray L1 is normally incident on the inclined plane 125 such that it is transmitted through the inclined plane 125 without being refracted. At this time, the direction angle E1 of the incident light ray L1 and transmitted light ray L1'is 90–$C_3$/2. Next, the incident light ray L2 having a direction angle of E2<E1 and the incident light ray L3 having a direction angle of E3>E1 are refracted toward the transmitted light ray L1' whieh is perpendicular to the inclined plane 125, while being transmitted through the inclined plane 125. This is because the refractive index of the light guide panel 100 made of PMMA (n2=1.49) is larger than the refractive index of an external medium, for example, air (n1=1). Therefore, based on the incident light ray L1 having the direction angle E1=90–$C_3$/2, a direction angle of transmitted light ray L2' corresponding to the incident light ray L2 having the direction angle E2<E1 is increased, whereas a direction angle of transmitted light ray L3' corresponding to the incident light ray L3 having the direction angle E3>E1 is decreased.

The range of direction angles of the LED 110, which is usually used as a point light source, as described is approximately ±90 degrees, and the range of direction angles within which the intensity of emitted light is at least half maximum is approximately ±45 degrees. Accordingly, it is preferable that the apex angle $C_3$ of the prism pattern 124 is 90 degrees. In this way, the maximum direction angle that light having an incident angle smaller than or equal to 45 degrees can have after passing through the prism pattern 124 becomes 45 degrees. The maximum direction angle of the transmitted light ray L3' becomes approximately ±73 degrees.

Further, when the apex angle $C_3$ of the prism pattern 124 is larger than 90 degrees, for example, $C_3$=120, in case of incident light having a direction angle smaller than 30 degrees, the direction angle after transmission is increased. Meanwhile, the direction angles of all other transmitted light rays are decreased. That is to say, while incident light having a direction angle in the range of 30 to 45 degrees passes through the prism pattern 124, a collimating effect of reducing the direction angle can be obtained. Here, the maximum direction angle of the transmitted light L3' is approximately ±65.5 degrees.

Therefore, when the LED 110 is used as a point light source, the apex angle $C_3$ of the prism pattern 124 is preferably greater than 90 degrees.

A relationship between the vertical $C_3$ of the prism pattern 124 and the angle α at which the intensity of light emitted by the point light source is half maximum is preferably determined to satisfy the formula $C_3 \geq (90-\alpha) \times 2$. As for the light having an incident angle smaller than α, there can be obtained an effect of partially increasing the direction angle and a collimating effect of partially decreasing the direction angle.

In the related art backlight system of FIG. 1, the maximum direction angle of light transmitted through the edge surface 11 into the light guide panel 10 is approximately ±42 degrees. According to the exemplary embodiment of the present invention, however, the prism pattern 124 is formed on the light incident surface 121 so that the maximum direction angle of light transmitted through the light incident surface 121 can be larger than ±42 degrees, thereby preventing dark areas.

Figure 7:
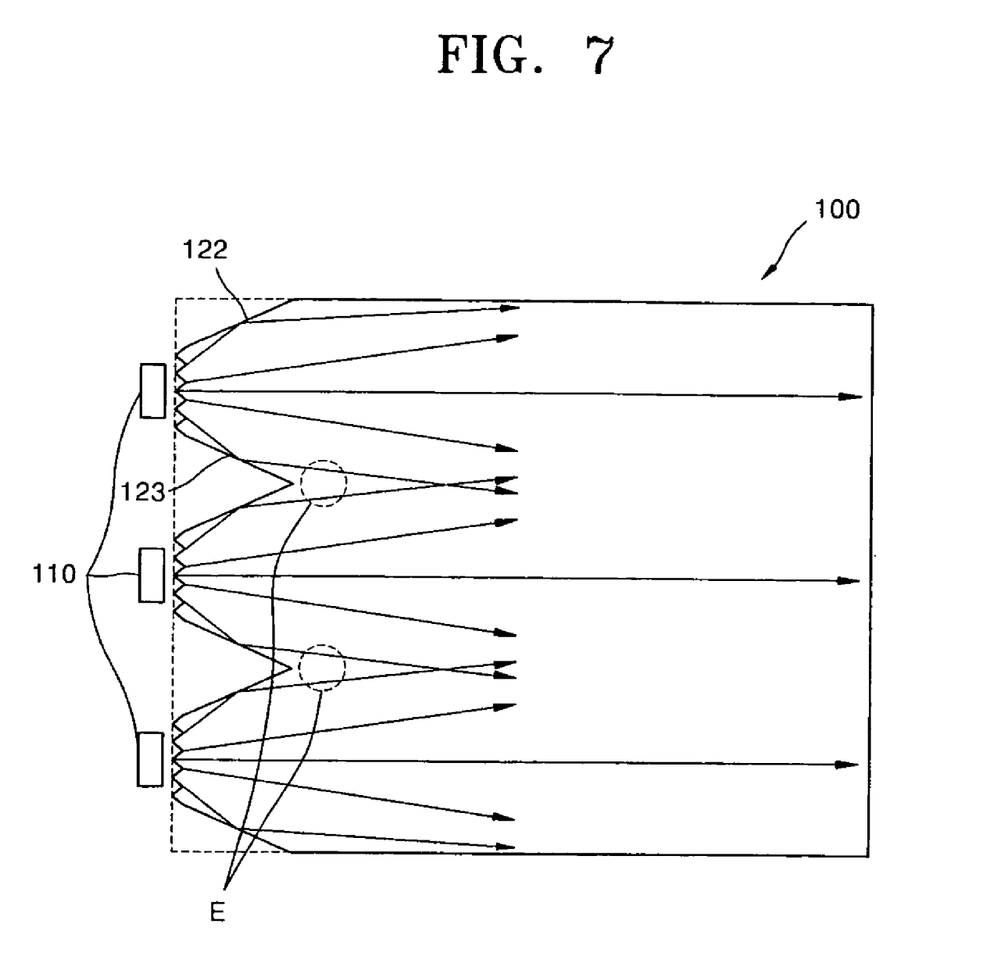
FIG. 7 is a diagram illustrating the operation of first and second surfaces.

FIG. 7 is a diagram illustrating operation of the first surface 122 and the second surface 123. Referring to FIG. 7, light entering through the light incident surface 121 propagates to the inside of the light guide panel 100. The first surface 122 and the second surface 123 are an interface between the light guide panel 100 and the external medium, namely, air. Among light incident on the first surface 122 and the second surface 123, light having an incident angle larger than a critical angle will be reflected. Since the first surface 122 and the second surface 123 are inclined with respect to the optical axis 112, a direction angle of the light reflected from the first surface 122 and the second surface 123 is decreased. In other words, the first surface 122 and the second surface 123 can function as collimating means for reducing the direction angle of light inside the light guide panel 100.

As described above, when the apex angle $C_3$ of the prism pattern 124 is 90 degrees, the maximum direction angle of light passing through the prism pattern 124 into the light guide panel 100 is 73 degrees. For total reflection of light having a direction angle of 73 degrees and incident on the first surface 122 and the second surface 123, the angle of incidence on the first surface 122 and the second surface 123 should be larger than 42 degrees. To meet this condition, the angle $C_1$ between the first surface 122 and the optical axis 112 and the angle $C_2$ between the second surface 123 and the optical axis 112 should be less than about 25 degrees. When the apex angle $C_3$ of the prism pattern 124 is larger than 90 degrees, the angle $C_1$ and the angle $C_2$ are less than 25 degrees.

Figure 8:
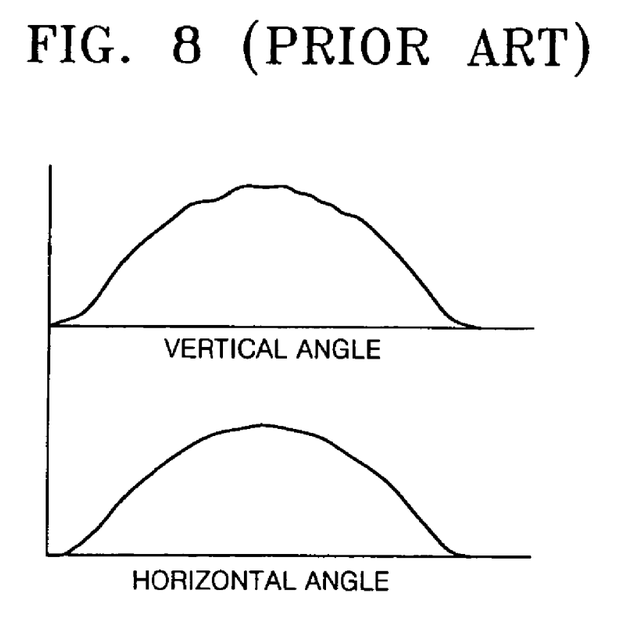
FIG. 8 is a graph illustrating the distribution of light emitted in the related art backlight system of FIG. 1, according to a simulation.
Figure 9:
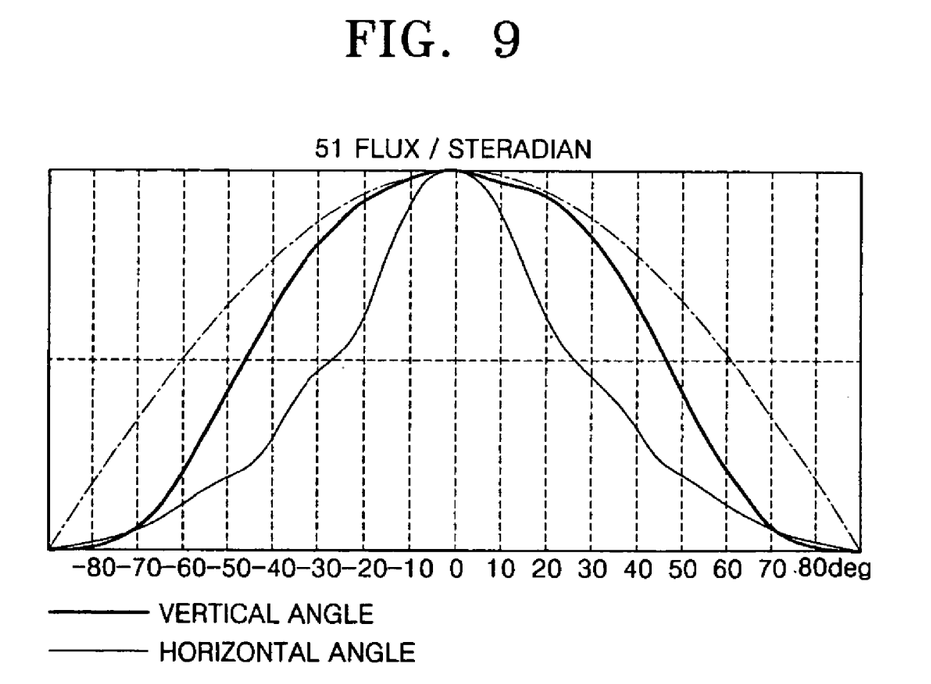
FIGS. 9 through 11 are graphs illustrating the simulated distribution of light emitted in backlight systems according to the present invention for three different vertical angles of a prism pattern.
Figure 10:
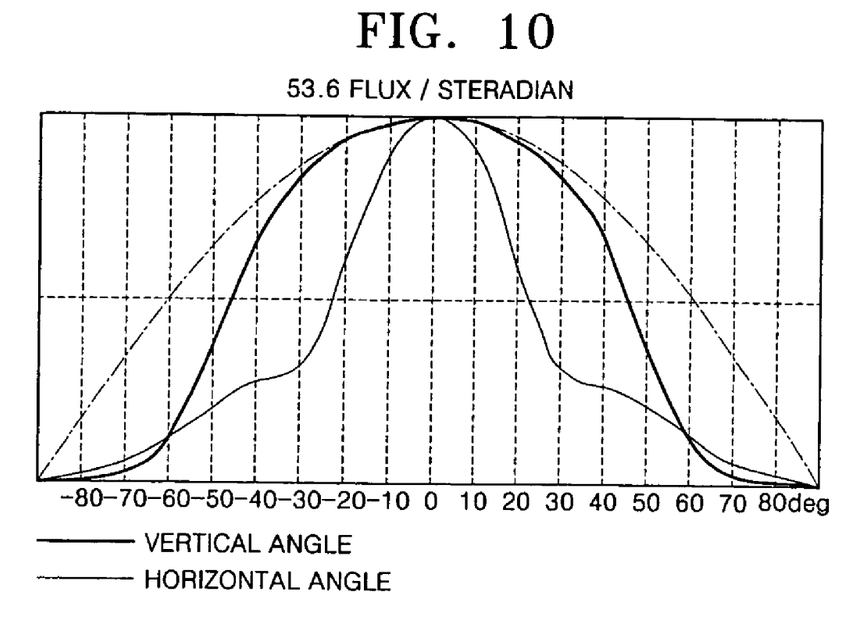
Figure 11:
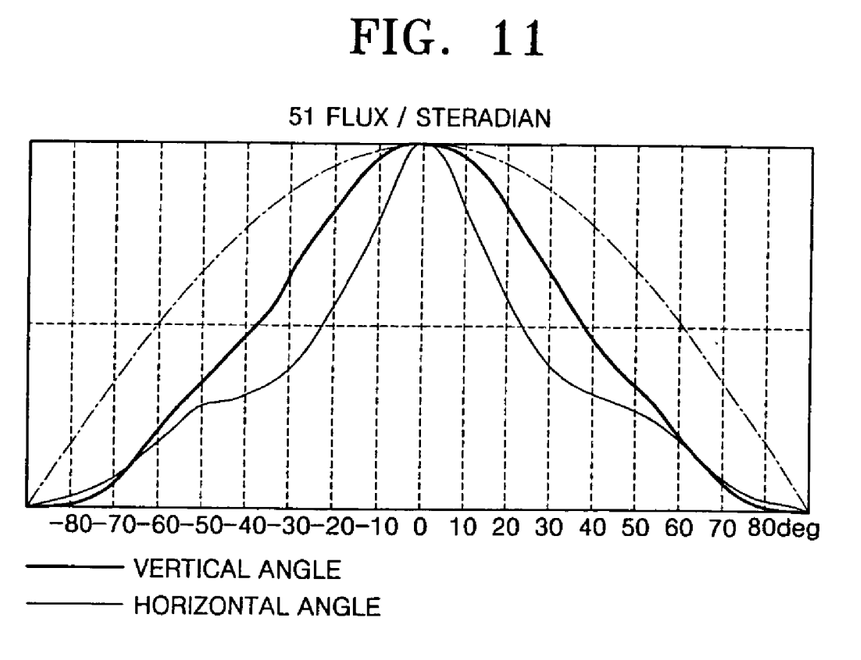

FIG. 8 is a graph illustrating the distribution of light emitted in the related art backlight system of FIG. 1, according to a simulation. FIGS. 9 to 11 are graphs illustrating the distribution of light emitted in backlight systems according to the present invention in which the apex angle $C_3$ of the prism pattern 124 is 145 degrees, 125 degrees and 100 degrees, respectively, according to simulations. The simulation results were obtained when the optical path-changing unit 130 was not used.

In the graphs of FIGS. 8 to 11, "Vertical angle" and "Horizontal angle" represent an elevation angle and the direction angle, respectively.

In case of FIG. 8, a total flux is 79.74, a flux/steradian is 29.1, and a horizontal angle at which intensity (flux) is half maximum is 55 degrees. In case of FIG. 9, a total flux is 79.1, a flux/steradian is 51, and the horizontal angle at which intensity (flux) is half maximum is 28 degrees. In case of FIG. 10, a total flux is 78.1, a flux/steradian is 53.6, and the horizontal angle at which intensity (flux) is half maximum is 22 degrees. Referring to FIG. 11, a total flux is 77.0, a flux/steradian is 51, and the horizontal angle at which intensity (flux) is half maximum is 22 degrees.

It can be seen from the simulation results that the backlight system according to the exemplary embodiment provides approximately the same total flux as the related art backlight system. However, the flux/steardian is significantly increased and the horizontal angle at which intensity is half maximum is drastically decreased. Such results mean that the direction angle distribution of light propagating through the light guide panel 100 is considerably reduced. Therefore, the efficiency of the optical path-changing unit 130 is improved, and uniform luminance over a greater area of the light emitting surface 102 is obtained. When a scattering pattern is used as the optical path-changing unit 130, a similar effect is achieved.

As explained above, by forming the prism pattern 124 on the light incident surface 121, the direction angle of light propagating through the light guide panel 100 can be widened and light can directly reach the dark areas 40 adjacent to the LED 110 of the light guide panel 100 shown in FIG. 1, thereby preventing the dark areas.

Further, a holographic pattern serving as the optical path-changing unit 130 has a specific orientation. The holographic pattern in which a diffraction grating structure is formed as described above diffracts and emits light at the highest efficiency when light is incident on the holographic pattern at an angle of 90 degrees. Furthermore, as the direction angle distribution of light introduced to the holographic pattern is smaller, a more uniform luminance distribution at the light emitting surface 102 can be obtained. According to the exemplary embodiment of the present invention, the first surface 122 and the second surface 123 collimate the light transmitted into the light guide panel 100 to reduce the range of direction angles, thereby improving the efficiency of the holographic pattern and obtaining more uniform luminance over the light emitting surface 102.

The light guide panel of the edge-light type backlight system and the edge-light type backlight system employing the same according to the present invention can achieve the following effects.

First, the range of direction angles of light transmitted into the light guide panel is widened using the prism pattern, thereby preventing dark areas.

Second, the range of direction angles of light propagating through the light guide panel is reduced by the collimation of the prism pattern and the first and second surfaces, thereby obtaining a more uniform luminance distribution over the light emitting surface.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light guide panel of an edge-light type backlight system comprising:
    a light incident part into which light enters from a point light source; and
    a light emitting surface from which light is emitted,
    wherein the light incident part comprises:
        a light incident surface on which a prism pattern is formed, the light incident surface facing the point light source; and
        first and second surfaces extending from the light incident surface in a direction in which light travels and adapted to reflect light passing through the light incident surface to reduce a direction angle, the first and second surfaces being opposite to each other with respect to an optical axis,
    wherein the prism pattern has a horizontal section in the shape of triangles, and
    wherein a relationship between an apex angle of the prism pattern and a half-maximum angle satisfies the following formula:

$$C_3 \geq (90-\alpha) \times 2,$$

where $C_3$ denotes the apex angle of the prism pattern, and $\alpha$ denotes the half-maximum angle at which intensity of light emitted by the point light source is half maximum.

2. The light guide panel of claim 1, wherein an angle between the first surface and the optical axis is the same as an angle between the second surface and the optical axis.

3. The light guide panel of claim 2, wherein the first and second surfaces are symmetrical about the optical axis.

4. The light guide panel of claim 1, wherein the point light source includes a light emitting diode, and an apex angle of the prism pattern is greater than 90 degrees.

5. The light guide panel of claim 1, wherein the prism pattern has a horizontal section in the shape of isosceles triangles.

6. The light guide panel of claim 1, wherein a pitch of the prism pattern is in a range of 10 to 100 μm.

7. An edge-light type backlight system comprising:
    a point light source;
    a light guide panel including a light incident part into which light enters from the point light source and a light emitting surface from which light is emitted; and
    an optical path-changing unit which changes a propagation path of light traveling inside the light guide panel,
    wherein the light incident part comprises:
        a light incident surface on which a prism pattern is formed, the light incident surface facing the point light source; and
        first and second surfaces extending from the light incident surface in a direction in which light travels inside the light guide panel and adapted to reflect light passing through the light incident surface to reduce a direction angle, the first and second surfaces being opposite to each other with respect to an optical axis,
    wherein the prism pattern has a horizontal section in the shape of triangles, and
    wherein a relationship between an apex angle of the prism pattern and a half-maximum angle satisfies the following formula:

$$C_3 \geq (90-\alpha) \times 2,$$

where $C_3$ denotes the apex angle of the prism pattern, and $\alpha$ denotes the half-maximum angle at which intensity of light emitted by the point light source is half maximum.

8. The edge-light type backlight system of claim 7, wherein an angle between the first surface and the optical axis is the same as an angle between the second surface and the optical axis.

9. The edge-light type backlight system of claim 8, wherein the first and second surfaces are symmetrical about the optical axis.

10. The edge-light type backlight system of claim 7, wherein the point light source includes a light emitting diode, and an apex angle of the prism pattern is greater than 90 degrees.

11. The edge-light type backlight system of claim 7, wherein the prism pattern has a horizontal section in the shape of isosceles triangles.

12. The edge-light type backlight system of claim 7, wherein a pitch of the prism pattern is in a range of 10 to 100 μm.

13. The edge-light type backlight system of claim 7, wherein the optical path-changing unit includes a holographic pattern formed on at least one of the light emitting surface of the light guide panel and a surface opposite to the light emitting surface.

14. The edge-light type backlight system of claim 7, wherein the optical path-changing unit includes a scattering pattern formed on at least one of the light emitting surface of the light guide panel and a surface opposite to the light emitting surface.

* * * * *